(12) United States Patent
Mori et al.

(10) Patent No.: US 9,341,233 B2
(45) Date of Patent: *May 17, 2016

(54) V-RIBBED BELT AND METHOD FOR MANUFACTURING SAME

(71) Applicant: THE GATES CORPORATION, Denver, CO (US)

(72) Inventors: Masahiro Mori, Yamatokoriyama (JP); Min Gao, Suzhou (CN); Lance C. Hall, Wilkesboro, NC (US); Shawn Xiang Wu, Rochester Hills, MI (US)

(73) Assignee: GATES CORPORATION, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,042

(22) Filed: Aug. 14, 2014

(65) Prior Publication Data

US 2014/0364262 A1   Dec. 11, 2014

Related U.S. Application Data

(63) Continuation of application No. 12/722,646, filed on Mar. 12, 2010, now Pat. No. 8,888,635, which is a continuation of application No. PCT/JP2008/058895, filed on May 8, 2008.

(30) Foreign Application Priority Data

Sep. 14, 2007  (JP) ................................. 2007-239003

(51) Int. Cl.
*F16G 5/08*   (2006.01)
*B29D 29/08*   (2006.01)
(Continued)

(52) U.S. Cl.
CPC ...... *F16G 5/08* (2013.01); *B29D 29/08* (2013.01); *B29D 29/103* (2013.01);
(Continued)

(58) Field of Classification Search
CPC .............. F16G 5/08; F16G 5/20; B29D 29/08; B29D 29/103; D03D 1/0094
USPC ........................................................ 474/237
See application file for complete search history.

(56) References Cited

U.S. PATENT DOCUMENTS

| | | |
|---|---|---|
| 2,597,284 A | 5/1952 | Brown et al. |
| 3,724,284 A | 4/1973 | Eng et al. |

(Continued)

FOREIGN PATENT DOCUMENTS

| | | |
|---|---|---|
| EP | 0662571 B1 | 4/1997 |
| EP | 1117949 B1 | 8/2002 |

(Continued)

OTHER PUBLICATIONS

Korean Intellectual Property Office, Notice to Submit a Response, Korean Patent Application No. 10-2009-7009092, mailing date Mar. 26, 2013.

(Continued)

*Primary Examiner* — William E Dondero
*Assistant Examiner* — Robert T Reese
(74) *Attorney, Agent, or Firm* — Paul N. Dunlap, Esq.; Jeffrey A. Thurnau, Esq.

(57) ABSTRACT

A V-ribbed belt that includes a ribbed surface covered with fabric is provided. The fabric is stretchable in two predetermined directions. A method for manufacturing the V-ribbed belt is also provided. The method includes placing a belt matrix about a mandrel, placing a fabric about the external circumference of the belt matrix which wraps around the mandrel, placing the mandrel inside a shell having a plurality of grooves on the internal circumference, expanding the belt matrix and the fabric toward the internal circumference of the shell and thus pressing the fabric onto the internal circumference having the multi-ribbed structure, and curing the belt matrix with the fabric. The fabric is stretchable to accommodate itself to the multi-ribbed structure.

19 Claims, 11 Drawing Sheets

(51) Int. Cl.
    B29D 29/10    (2006.01)
    F16G 5/20     (2006.01)
    D03D 1/00     (2006.01)
    D03D 3/02     (2006.01)
    D03D 15/00    (2006.01)
    D03D 15/08    (2006.01)
    D04B 1/22     (2006.01)
    B29L 29/00    (2006.01)

(52) U.S. Cl.
    CPC ............ *D03D 1/0094* (2013.01); *D03D 3/02* (2013.01); *D03D 15/0077* (2013.01); *D03D 15/08* (2013.01); *D04B 1/225* (2013.01); *F16G 5/20* (2013.01); *B29L 2029/00* (2013.01); *D10B 2201/02* (2013.01); *D10B 2201/04* (2013.01); *D10B 2201/06* (2013.01); *D10B 2331/02* (2013.01); *D10B 2331/10* (2013.01); *D10B 2403/0312* (2013.01); *D10B 2505/02* (2013.01); *Y10T 156/1041* (2015.01)

(56)         References Cited

U.S. PATENT DOCUMENTS

| 3,839,116 A | 10/1974 | Thomas et al. |
| 3,981,206 A | 9/1976 | Miranti et al. |
| 4,027,545 A | 6/1977 | White, Jr. |
| 4,169,393 A | 10/1979 | Wetzel et al. |
| 4,464,153 A | 8/1984 | Brew |
| 4,740,192 A | 4/1988 | Mashimo et al. |
| 4,891,040 A | 1/1990 | Nagai et al. |
| 4,936,814 A | 6/1990 | Colley et al. |
| 5,645,504 A | 7/1997 | Westhoff |
| 6,419,775 B1 | 7/2002 | Gibson et al. |
| 6,561,937 B1 | 5/2003 | Wegele |
| 6,572,505 B1 | 6/2003 | Knutson |
| 6,609,990 B2 | 8/2003 | Kopang |
| 6,685,785 B1 | 2/2004 | Morris et al. |
| 6,793,599 B2 | 9/2004 | Patterson et al. |
| 6,824,485 B2 | 11/2004 | Edwards et al. |
| 6,863,761 B2 | 3/2005 | Knutson |
| 8,632,650 B2 | 1/2014 | Mori et al. |
| 8,888,635 B2 * | 11/2014 | Mori et al. ............. 474/237 |
| 2004/0048709 A1 | 3/2004 | Knutson |
| 2005/0096433 A1 | 5/2005 | Takehara et al. |
| 2008/0261739 A1 | 10/2008 | Kanzow et al. |

FOREIGN PATENT DOCUMENTS

| EP | 1117947 B1 | 1/2004 |
| EP | 1388598 A1 | 2/2004 |
| JP | 57-086648 | 5/1982 |
| JP | 05-065943 A | 3/1993 |
| JP | H07228725 A | 8/1995 |
| JP | H07046828 Y | 10/1995 |
| JP | 08-312724 A | 11/1996 |
| JP | 2000-337445 A | 12/2000 |
| JP | 2001082549 A | 3/2001 |
| JP | 2001207358 A | 8/2001 |
| JP | 2004034352 A | 2/2004 |
| JP | 2004174772 A | 6/2004 |
| JP | 2004251402 A | 9/2004 |
| JP | 2005240862 A | 9/2005 |
| JP | 2006234153 A | 9/2006 |
| JP | 200792991 A | 4/2007 |

OTHER PUBLICATIONS

Kirby IP Canada; Filing of Prior Art Under Section 34.1 and Protest Under Rule 10; CIPO doc. No. 6003106678 against CA 2,698,365; Feb. 8, 2012.

Hoechst Celanese, Dictionary of Fiber & Textile Technology, Hoeschst Celanese, Charlotte, NC, p. 159, 1990.

Saurer, Heberlein Components Only Better, 1 page, Aug. 2013.

* cited by examiner

V-RIBBED BELT AND METHOD FOR MANUFACTURING SAME

CROSS-REFERENCE TO RELATED APPLICATIONS

The present application is a continuation of U.S. application Ser. No. 12/722,646 filed on Mar. 12, 2010, which is a continuation of International Application PCT/JP2008/058895 filed on May 8, 2008, which claims the benefit of Japanese Patent Application No. 2007-239003 filed on Sep. 14, 2007, all of which are hereby incorporated herein by reference in their entirety.

BACKGROUND

The present invention relates to a V-ribbed belt which is applied in mechanical power transmission, and a method for manufacturing such a V-ribbed belt.

As for the method of manufacturing a V-ribbed belt, the following two are known. In one method, a rubber matrix arranged around a mold is cured, and then the belt surface thereof is ground to form ribs. In another method, i.e., in the so-called molding method, a rubber matrix is molded in a mold having a predetermined multi-ribbed structure and vulcanized or cured whereby a plurality of ribs is formed. The basic characteristics of a belt with the rib rubber material exposed on the rib surface, such as its power transmission performance, its slip noise properties and so on, are mainly determined by the physical properties of the materials on the rib surface, which in turn is affected by the rib rubber material and materials compounded into the rib rubber material, such as short fibers, etc. However, the rib surface deteriorates over time due to wear. In an application of the molding method, some types of belts are provided with a non-woven fabric on the rib surface as disclosed in PCT Japanese Translation Patent Publication No. 2005-532513, but these lack durability.

SUMMARY

In the case of a conventional power transmission belt as described above, such as the conventional V-ribbed belt, the rib surface is vulnerable to wear, making it difficult to maintain in a stable state. Furthermore, the coefficient of friction tends to increase with use and this may increase the production of noise.

Therefore, an object of the present invention is to improve the durability of the rib surface of a V-ribbed belt as well as to prolong the desired condition of the rib surface.

According to an aspect of the present invention, a V-ribbed belt including a rib surface covered with fabric is provided. The fabric is stretchable in two predetermined directions.

According to another aspect of the present invention, a method for manufacturing the V-ribbed belt is provided. The method includes placing a belt matrix about a mandrel, placing a fabric about the external circumference of the belt matrix, which wraps around the mandrel, placing the mandrel inside a shell having a plurality of grooves on the internal circumference, expanding the belt matrix and the fabric toward the internal circumference of the shell, and thus pressing the fabric against the internal circumference with the multi-ribbed structure, and curing the belt matrix with the fabric. The fabric stretches to accommodate itself to the multi-ribbed structure.

BRIEF DESCRIPTION OF THE DRAWINGS

The objects and advantages of the present invention will be better understood from the following description, with reference to the accompanying drawings in which.

DETAILED DESCRIPTION

Embodiments of the present invention are described below with reference to the drawings.

[First Embodiment]

Figure 1:
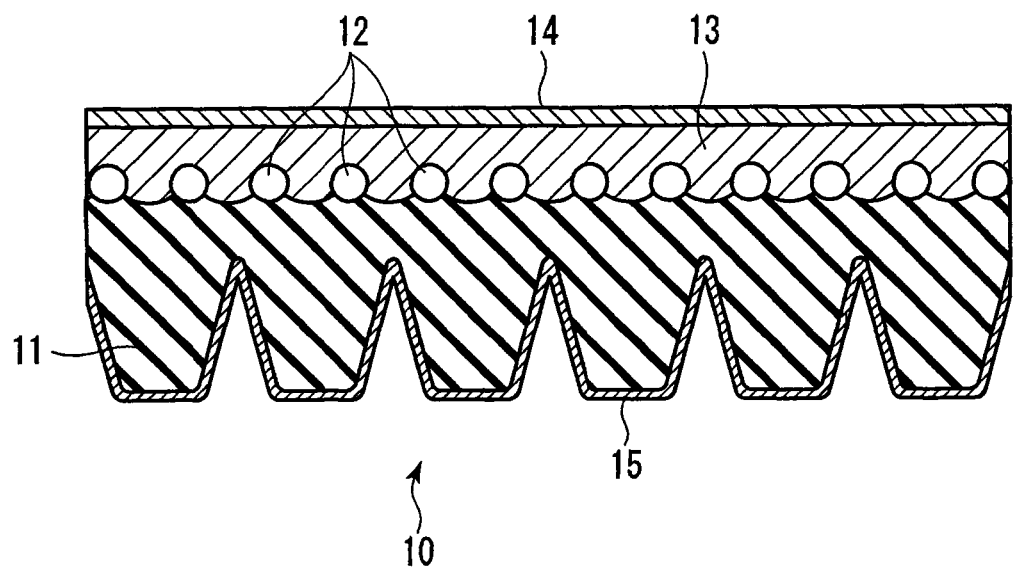
FIG. 1 is a section view of a V-ribbed belt according to an embodiment of the invention, in a plane perpendicular to the belt longitudinal direction.

FIG. 1 is a sectional view of a V-ribbed belt of the first embodiment, in a plane perpendicular to the belt longitudinal direction. The structure of the V-ribbed belt in the embodiment is described with reference to FIG. 1.

The V-ribbed belt 10 includes a rib-rubber layer 11 formed as a multi-ribbed structure, an adhesive rubber layer in which tensile cords 12 are embedded, and a backing fabric 14 bonded to the back face of the adhesive rubber layer 13. In addition, the surface of the rib-rubber layer 11 is covered with a fabric 15, such as woven fabric or knitted fabric.

The fabric 15 is selected from material with sufficient stretchability. Furthermore, the material is selected so as to afford sufficient durability to the belt in consideration of the performance required of the rib surface (e.g., in terms of wear resistance, heat resistance, stability of friction coefficient, water resistance, and slip and noise properties).

For example, the material of the fabric 15 may include elastic yarn or fiber including polyurethane and at least one type of non-elastic yarn or fiber including cellulose- or non-cellulose-based yarn or fiber, or a blend thereof. The blend of cellulose-based yarn or fiber and the non-cellulose-based yarn or fiber is made either by blending two types of fibers in yarn spun or twist or by feeding different types of yarns during the fabric manufacturing process.

The cellulose-based yarn or fiber includes natural fiber including cotton, linen, jute, hemp, abaca, and bamboo; man-made fiber including rayon and acetate; and combinations thereof.

Non-cellulose-based yarn or fiber includes polyamide, polyester, polyethylene naphthalate, acrylic, aramid, polyolefin, polyvinyl alcohol, liquid crystal polyester, polyetheretherketone, polyimides, polyketone, PTFE, e-PTFE, PPS, PBO, wool, silk and combinations thereof.

For improved wet performance, the fabric includes a two-yarn construction including a first yarn which is elastic such as polyurethane, and a second yarn of cellulose such as cotton. Furthermore, a three or more yarn construction including an elastic yarn or fiber, a cellulose yarn or fiber, and other yarns, may be used. A third yarn may be selected according to the desired wear resistance.

Namely, the first yarn is an elastic yarn such as polyurethane, which provides the fabric with a high level of stretchability. The second and third yarn or fibers could consist of a blend of two different types of yarn or fibers, which may be combinations of cellulose yarn or fiber and non-cellulose yarn or fiber, blended in different ratios. One type is non-cellulose yarn or fiber, which provides the wear resistance or durability. The other type is cellulose yarn or fibers, which will provide superior wet performance. In some applications the cellulose yarn or fiber alone can provide adequate durability and wet performance.

The blend ratio of cellulose-based yarn or fiber and non-cellulose-based yarn or fiber may range from 100:0 to 0:100. A ratio of cellulose-based yarn or fiber from 5% to 100% and non-cellulose-based yarn or fiber from 0% to 95% is preferable. Furthermore, the ratio of the elastic yarn or fiber to the non-elastic yarn or fiber may be from 2% to 40%.

Figure 2:
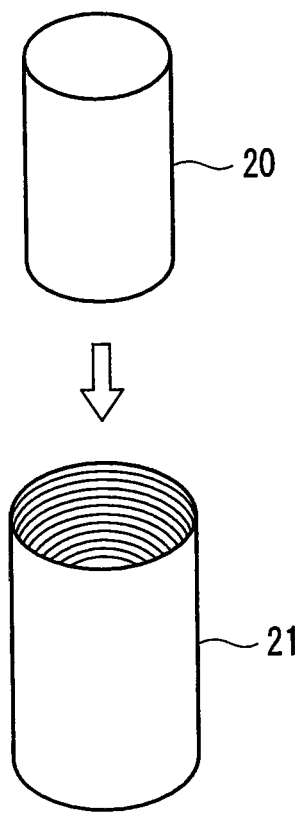
FIG. 2 is a perspective view that schematically illustrates the arrangement of a mandrel and a shell which are used in the belt molding of the embodiment.
Figure 3:
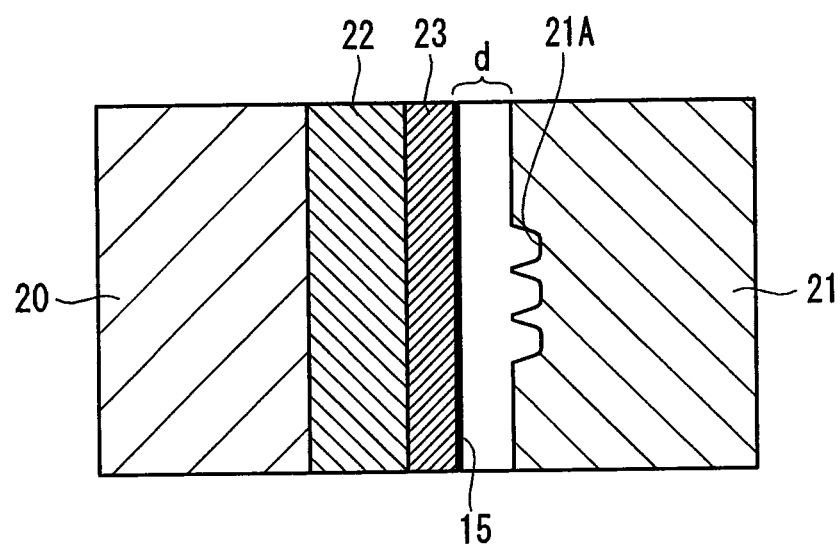
FIG. 3 is an enlarged partial sectional view schematically showing the arrangement of the mandrel and shell along the radial direction before the curing process.
Figure 4:
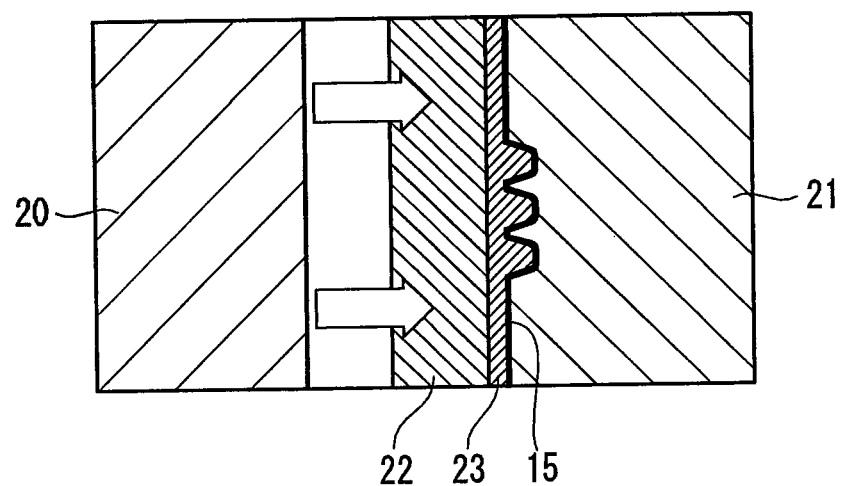
FIG. 4 is an enlarged partial sectional view schematically showing the arrangement of the mandrel and shell in the radial direction in the course of the curing process.

The process for manufacturing the V-ribbed belt 10, in which the molding process is applied, will next be described with reference to FIGS. 2-4. FIG. 2 is a perspective view that schematically illustrates a mandrel (inner mold) and a shell (outer mold) for molding the V-ribbed belt 10 in this embodiment. FIGS. 3 and 4 are enlarged partial sectional views of the mandrel and the shell along the radial direction, which schematically illustrate their arrangement. FIG. 3 illustrates the arrangement before vulcanization and curing, and FIG. 4 illustrates the arrangement during vulcanization and curing.

A rubber pad 22 is arranged around the external circumference of the cylindrical mandrel 20, and belt materials 23 (including the backing fabric 14, an adhesive rubber matrix for forming the adhesive rubber layer 13, the tensile cords 12, and a rib rubber matrix for forming the rib rubber layer 11) are arranged around the outside of the rubber pad 22. In addition, fabric 15 is arranged around the outside of the belt materials 23. In this embodiment, the fabric 15 is tubular and either of seamless or seamed fabric. However, non-tubular fabric can also be used by winding the fabric 15 around the mandrel 20 with both ends overlapping. The mandrel 20, onto which both the belt materials 23 and fabric 15 are provided, is coaxially installed inside the cylindrical shell 21. At this time, a clearance d is interposed between the fabric 15 and the internal circumference of the shell 21, as shown in FIG. 3.

In conjunction therewith, the fabric 15 is post-processed to enhance the performance and the post-processing includes washing with hot water or chemicals, heat-setting, dying, adhesive treating, and laminating. As for the adhesive treating, an additional treatment using gum Arabic, adhesives such as RFL, and resin (for example, phenol or fluoric resin), is normally applied to the fabric 15 in order to enhance the adhesion of the fabric to the rubber material, or in order to obtain a performance characteristic required by the application. However, in some cases, no such additional treatment is applied.

The shell 21 has a number of grooves 21A in the form of a V-ribbed structure on the internal circumference, wherein the grooves are aligned in the circumferential direction and are disposed in order to form the multi-ribbed structure of the V-ribbed belt 10. In the curing process, any suitable temperature-controlled fluid medium such as air, nitrogen, oil, water or steam is fed at high pressure between the rubber pad 22 and the mandrel 20, so that the rubber pad 22 is expanded outwardly in the radial direction. As a result, the belt materials 23 and the fabric 15 are expanded outwardly in the radial direction, and thereby pressed against the internal circumference of the shell 21. In this process, the fabric 15 is deformed together with the rib-rubber layer 11 of the belt material 23, and then crammed into the grooves 21A formed on the internal circumference of the shell 21, thereby enabling a multi-ribbed structure to be formed, as shown in FIG. 4. Moreover, the fabric 15 is in pressurized contact with, or bonded to the rib-rubber layer in the curing process, so that the fabric 15 and the surface of the rib-rubber layer 11 become integrated.

Namely, the molding process according to the embodiment is carried out in the following steps: provide the belt material around the mandrel, cover the external circumference of the belt material with the fabric, install the mandrel (onto which both the belt material and the fabric are mounted) into the inside of the shell, and expand the belt material and the fabric toward the internal circumference of the shell, thus keeping them pressed against the multi-ribbed structure while the curing process is carried out. Incidentally, the belt matrix is cured after the penetration of the belt matrix into the fabric.

In FIGS. 3 and 4, only three grooves 21A are shown. However, a plurality of grooves is actually arranged over the entire internal circumference of the shell 21, as shown in FIG. 2. Moreover, the resulting piece with a multi-ribbed structure, prepared by the curing process, is removed from the shell 21 and cut along the ribs to a predetermined belt width, thereby producing a plurality of V-ribbed belts 10.

In the belt manufacturing process described above, both the belt material 23 and the fabric 15 are radially expanded away from the cylindrical mandrel 20, thereby stretching the fabric 15 in the circumferential direction of the cylindrical mold, that is, in the belt longitudinal direction. At the same time, the deformation of both the rib rubber and fabric 15 in accordance with the shape of grooves 21A in the shell causes the fabric 15 to be stretched in the axial direction of the cylindrical mold, that is, in the belt lateral direction.

Figure 5:
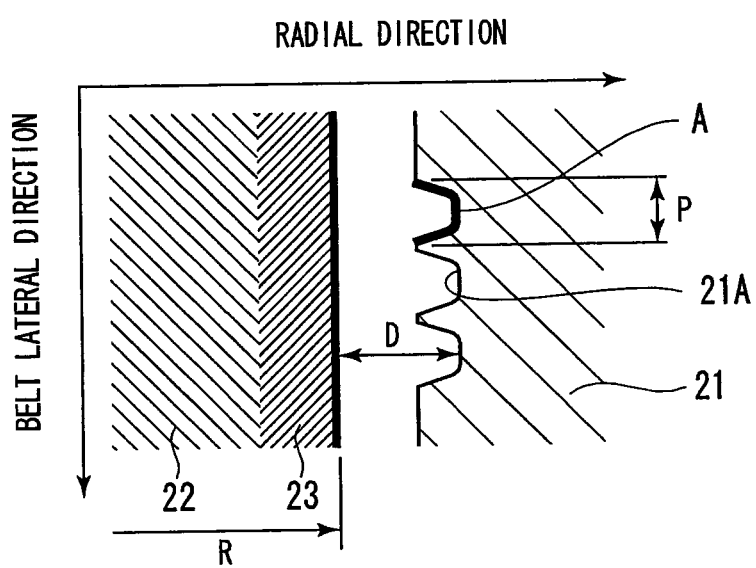
FIG. 5 schematically shows a sectional view of the arrangement for measuring the extension properties of a woven fabric.

As shown schematically in FIG. 5, when it is assumed that the initial position of the fabric 15 disposed around the mandrel 20 (i.e., the position of the fabric 15 at the beginning of the molding process) is at radius R from the center of the mandrel 20 and that the distance between the initial position of the fabric 15 and the bottom surface of the groove 21A in the shell 21 (whose bottom surface corresponds to the rib tip of the V-ribbed belt) is D, then the length of the fabric 15 in the circumferential direction (the belt longitudinal direction) changes from the initial radial distance $2\pi R$ to the elongated radial distance $2\pi(R+D)$. Accordingly, the extension of the fabric 15 in the circumferential direction (i.e., the belt longitudinal direction) can be represented by dividing the difference between the elongated radial distance $2\pi(R+D)$ and the initial radial distance $2\pi R$ by the initial radial distance $2\pi R$, giving D/R. Incidentally, the extension of the fabric in the circumferential direction includes the stretch needed to fit the mold.

On the other hand, the extension of the fabric 15 in the axial direction (i.e., in the belt lateral direction) can be expressed as (N×A−L)/L, where A is the profile length of a groove 21A along the axial direction (see FIG. 5); N is the number of ribs formed in the mold; and L is the length of the grooved surface in the axial direction (i.e., the total length in the belt lateral direction where the ribs are formed). When the rib pitch p is employed, then L is expressed as L=N×p. Accordingly, the extension of the fabric in the axial direction (i.e., in the belt lateral direction) is found to be (A/p−1). Note that the profile length A corresponds to the length of one rib section, as shown by a thick line in FIG. 5, and the length A depends on the shape of the rib.

The extension of the fabric 15 in the circumferential and axial directions should be values in which the fabric attached to the rib surface maintains certain properties desired in the V-ribbed belt. In the first embodiment, the requirement that the fabric 15 maintain certain properties in its role as the rib surface fabric necessitates, for instance, that the belt material 23 not fully penetrate the mesh of the fabric 15 during the pressurization.

In the manufacture of the V-ribbed belt implementing the molding process used in the embodiment, a fabric is used which shows an extension greater than D/R in the circumferential direction (i.e., in the belt longitudinal direction), and an extension greater than (N×A−L)/L (or A/p−1) in the axial direction (i.e., in the belt lateral direction), under a particular condition (tension per unit width). Namely, a stretchability range in either direction is defined so that the fabric will maintain certain properties at the rib surface. Details of the range will be given afterward, referring to the comparison between the inventive and comparative examples.

A fabric that does not satisfy the above-mentioned extension in the circumferential direction of the mandrel specified by both the shape of the rib and the dimensions of the mandrel in a given condition, may nevertheless be applied in some cases, when seamless or seamed tubular fabric is not used, by overlapping the ends of the fabric sheet or by allowing space, uncovered by the fabric, between the ends of the fabric sheet in the belt longitudinal direction.

On the other hand, if the fabric cannot be sufficiently stretched in the axial direction of the mandrel, the fabric will not be displaced to the position where it contacts the shell, despite being deformed along the rib cavity of the shell. Furthermore, the rib rubber material will pass through the mesh of the fabric, such that the rib rubber material will fill the shell mold. As a result, the fabric will be completely embedded in the rib-rubber layer, such that the rib rubber directly forms the rib surface. Therefore, in order to successfully manufacture the multi-ribbed belt by pressing the belt material against the shell and producing a rib surface properly covered with fabric, as in the present embodiment, it is necessary to use fabric with sufficient extensibility at least in the axial direction (i.e., extensibility sufficient to allow the fabric to contact the shell mold and deform into the shape of the mold).

As for such fabric, the knitted fabric described above or a woven fabric may be used. In the case of a woven fabric, one whose warp, weft, or both, include an elastic yarn or textured yarn having undergone a finishing process such as curl-crimp finish, woolly finish, Taslan finish, interlace finish, covering finish, etc., or some combination thereof is used. Note that the above-mentioned extensibility is the minimum desired in the manufacturing process. Greater extensibility would actually be desired to satisfy the conditions of belt use. For example, additional extensibility would be desired in the belt longitudinal direction for the belt to be flexible under small-pulley bending and reverse bending.

As described above, in accordance with the first embodiment, fabrics including woven or knitted fabric, which are more durable than non-woven fabric, can be integrally provided on the rib surface, thereby improving the durability of the belt surface and the long-term maintenance of the belt surface condition. Concomitantly, the slip and the generation of abnormal sound are suppressed. In particular, the present embodiment allows the fabric to be integrally attached to the rib surface in the process of molding and curing, thereby effectively enhancing the durability of the rib surface of the V-ribbed belt and maintaining the state of the rib surface in the long-term.

In the following, the conditions for specifying the extensibility of the fabric in the first embodiment will be described, referring to inventive and comparative examples.

EXAMPLES

First, it was examined as to whether the elongation or extension of the woven nylon fabric and knitted nylon fabric used in the examples coincided with the elongation defined by the dimensions of the mold applied in the molding process. In this test, a sheet of woven fabric was used in Example 3 and sheets of knitted fabric were used in Examples 4-6.

In this confirmation test, a cross-mark with a length of 100 mm in both the longitudinal and lateral directions was drawn on the sheet of fabric, aligned to the axial and circumferential directions of the mandrel. The fabric was applied around the belt material, which had been previously applied around the mandrel, and then installed inside the shell, together with the mandrel. Then, the V-ribbed belt was formed with these materials, utilizing the molding process. The process was carried out under the conditions of (N×A−L)/L (or A/p−1)=0.8011 (80.11%) in the axial direction of the mandrel (i.e., in the belt lateral direction), and D/R=0.0306 (3.06%) in the circumferential direction of the mandrel (i.e., in the belt longitudinal direction).

Figure 6:
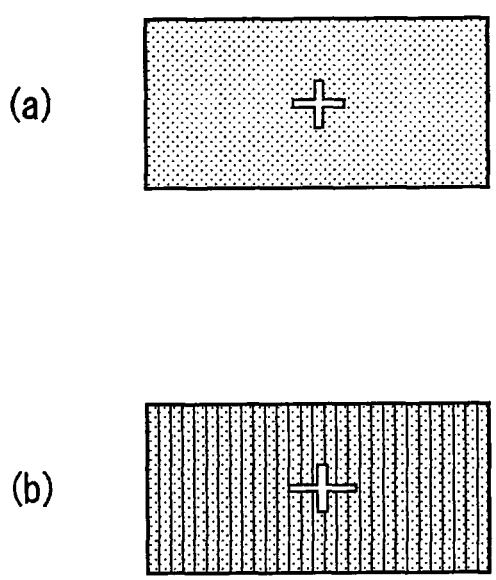
FIG. 6 shows plan views of a sheet of fabric used to determine a method for measuring the extension properties of the nylon woven fabric or knitted fabric used in the inventive and comparative examples.

FIG. 6(*a*) is a schematic plan view of the unprocessed fabric sheet on which a cross-mark is drawn. FIG. 6(*b*) is a schematic plan view of unwrapped processed fabric sheet on which the cross-mark is drawn. After the extension of the fabric, a ruler was used to measure the lengths of the cross-mark arms. The length of the cross-mark in the circumferential direction (i.e., in the belt longitudinal direction) was 102-104 mm (an extension of 2-4%), and in the axial direction (i.e., in the belt lateral direction) it was 173.12-179.53 mm (an extension of 73.12-79.53%). The extension of all the fabric sheets approximately matched these values.

Figure 7:
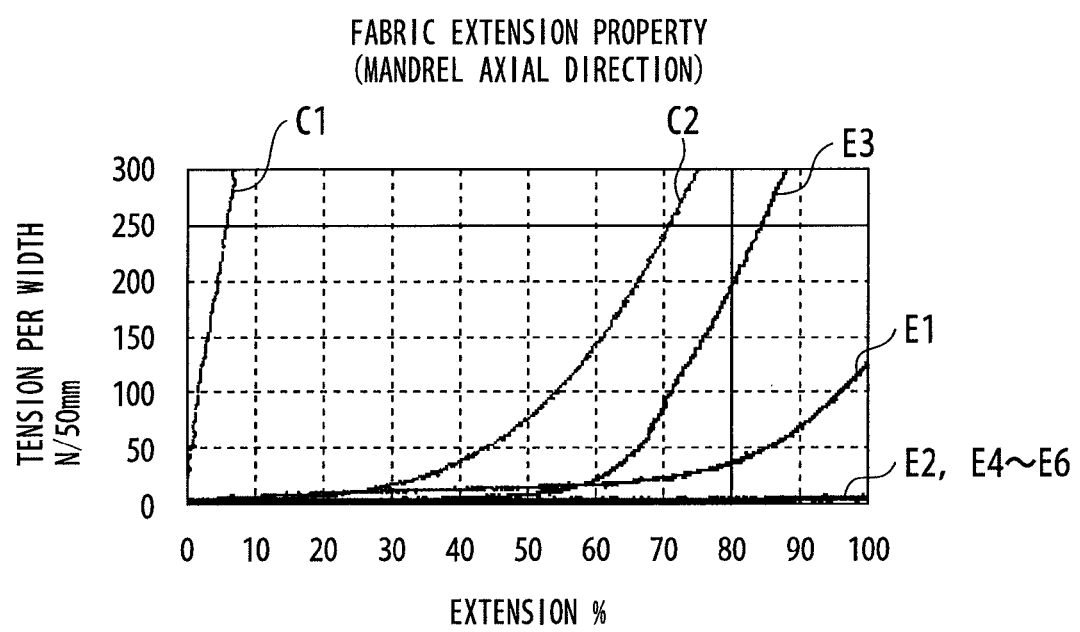
FIG. 7 is a diagram showing the results of a tensile test in the axial direction (i.e., in the belt lateral direction) on the sheet of fabric of Examples 1-6 and Comparative Examples 1 and 2.

FIG. 7 shows the results of a tensile test in the direction corresponding to the axial direction of the mandrel (i.e., the belt lateral direction) for the sheets of fabric (woven and knitted) of Examples 1-6 and Comparative Examples 1 and 2. The extension properties for each test piece are shown in the diagram of FIG. 7, where the abscissa indicates the extension (%) and the ordinate indicates the tension (N) applied to the fabric per unit width (50 mm) in the tensile direction.

Woven fabric was used in Examples 1-3 and in Comparative Example 1, while knitted fabric was used in Examples 4-6 and in Comparative Example 2. The test pieces of Examples 1-6 gave the stretch properties represented by curves E1-E6, and the test pieces of Comparative Examples 1 and 2 gave the stretch properties represented by curves C1 and C2.

Furthermore, using the fabric of Examples 1-6 and of Comparative Examples 1 and 2, V-ribbed belts were formed with the molding process of the present embodiment under the conditions that the extension in the axial direction (i.e., in the belt lateral direction) be (N×A−L)/L (or A/p−1)=0.8011 (80.11%). The V-ribbed surface was suitably covered with the fabric in the molding using the fabric of Examples 1-6. However, as for the fabric of Comparative Examples 1 and 2, the belt material passed through the mesh of the fabric during the pressurizing process so that the fabric was not left exposed at the rib surface.

Referring to the diagram of FIG. 7 and the molding test results of the V-ribbed belt of Examples 1-6 and Comparative Examples 1 and 2, it can be appreciated that fabric with approximately 250 N/50 mm (the first value) or less tension per unit width in the axial direction of the mandrel (i.e., in the belt lateral direction) when the extension of the fabric in the axial direction (i.e., in the belt lateral direction) is (N×A−L)/L (or A/p−1), is preferable in order to achieve the desired conditions of the fabric on the rib surface, in the case of the V-ribbed belt manufactured by the molding process of the first embodiment. Namely, in the present examples, it is preferable to apply a fabric that shows 250 N/50 mm or less tension per unit width when the extension is approximately 80%. Moreover, in the present examples, the tension (per unit width) of the fabric is preferably 200 N/50 mm or less when the extension of the fabric in the axial direction (i.e., in the belt lateral direction) is approximately 80%. Note that these statements can be interpreted as selecting fabric having an extensibility of 80% or greater at 250 N/50 mm, and more preferably, at 200 N/50 mm, in the axial direction (the belt lateral direction).

Figure 8:
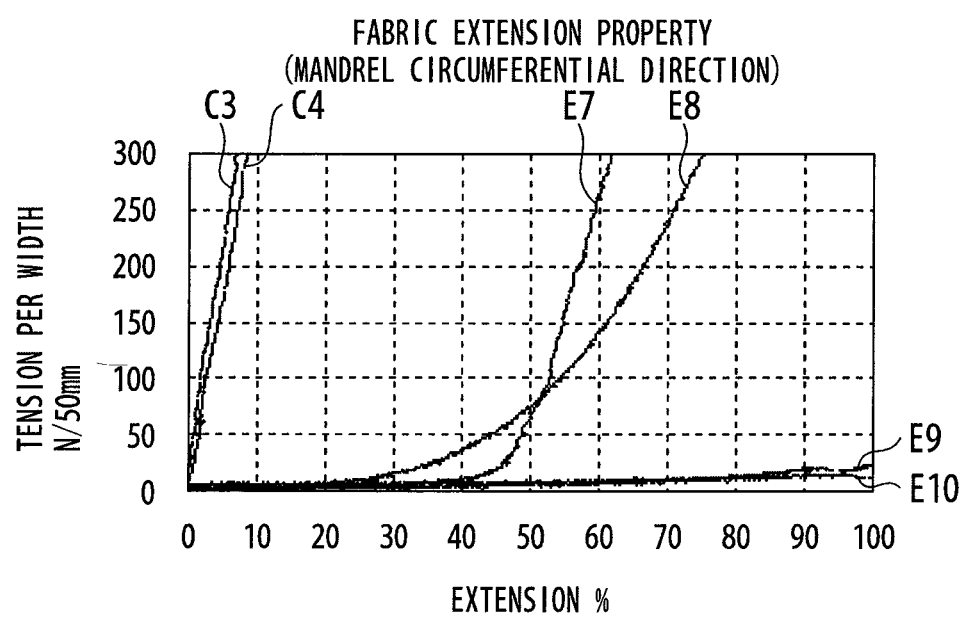
FIG. 8 is a diagram showing the results of a tensile test in the circumferential direction (i.e., in the belt longitudinal direction) on the sheet of fabric of Examples 7-10 and Comparative Examples 3 and 4.
Figure 9:
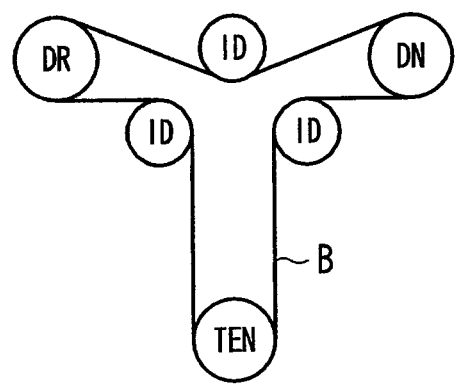
FIG. 9 is a layout of a running test machine used to test durability under reverse bending.

Referring to FIGS. 8 and 9, the relationship between the extension of the fabric in the circumferential direction (i.e., in the belt longitudinal direction) and the durability of the belt subjected to reverse bending will be described next.

FIG. 8 is a diagram showing the results of a tensile test performed in the circumferential direction of the mandrel (i.e., in the belt longitudinal direction) for the woven and knitted fabric of Examples 7-10 and Comparative Examples 3 and 4. The abscissa indicates the extension (%) and the ordinate indicates the tension (N) applied to the fabric per unit width (50 mm) in the tensile direction. Woven fabric was used in Comparative Examples 3 and 4 and in Example 7, while knitted fabric was used in Examples 8-10. The extension properties of the test pieces of Examples 7-10 are indicated by curves E7-E10, respectively, whereas the extension properties of the test pieces of Comparative Examples 3 and 4 are indicated by curves C3 and C4, respectively.

Similarly to Examples 1-6 and Comparative Examples 1 and 2, V-ribbed belts were molded under the extension condition specified on the circumferential direction (i.e., D/R=0.0306 (3.06%)), using fabrics with the properties of those in Examples 7-10 and Comparative Examples 3 and 4, in accordance with the molding process of the present embodiment. In this case, the V-ribbed belts were manufactured with a service life aimed at 500 hrs.

Next, a durability test (belt bending test) for a belt subjected to reverse bending was carried out on the V-ribbed belts that were manufactured using the fabrics of Examples 7-10 and Comparative Examples 3 and 4, applying a running test machine whose layout is illustrated in FIG. 9.

The running test machine of FIG. 9 was configured as a V-ribbed belt B entrained around a drive pulley DR, a driven pulley DN, a tensioner pulley TEN, and three idler pulleys ID interposed respectively between the pulleys DR, DN, and TEN. The drive pulley DR, the driven pulley DN and the tensioner pulley TEN had an effective diameter of 70.00 mm, whereas the idler pulleys ID had an effective diameter of 52.00 mm. The running test machine was operated at an ambient temperature of 100° C., wherein the drive pulley DR was rotated at 5,200 rpm, and wherein the axial load of the belt was 588 N.

In the running test of the V-ribbed belts of Comparative Examples 3 and 4, cracks appeared within 24 hrs and the test was stopped after 328.4 and 166.4 hr runs, respectively, when either a rib broke or a large number of cracks formed. On the other hand, in the case of the V-ribbed belts of Examples 7 and 8, cracks appeared after 305 and 524.2 hrs, respectively. The test run on the V-ribbed belt of Example 7 was stopped at the 650-hr mark, when the number of cracks reached the number of ribs plus one. However, for the V-ribbed belt of Example 8, only three cracks were found after 1003.7 hrs of running. Furthermore, as for Examples 9 and 10, no cracks were detected even after running 400 hrs.

Thus, satisfactory durability resistance against belt reverse bending was obtained with the belt using the fabric of Examples 7-8, but not that of Examples 3 and 4. Therefore, from the diagram of FIG. 8, it can be appreciated that for the fabric to give satisfactory durability against reverse bending, it should preferably be selected from among fabrics that shows approximately 50 N/50 mm (the second value) or less tension per unit width in the circumferential direction of the mandrel (i.e., in the belt longitudinal direction) when the extension in the circumferential direction (i.e., in the belt longitudinal direction) is defined as R/D. Namely, in the present examples, the tension of the fabric in the circumferential direction (i.e., in the belt longitudinal direction) per unit width should preferably be 50N/50 mm or less when the extension in the circumferential direction (i.e., in the belt longitudinal direction) is approximately 3%. This statement may be interpreted as selecting fabric having an extensibility of 3% or greater at 50N/50 mm in the circumferential direction (the belt longitudinal direction).

Referring to Tables 1-3, the results of the slip and noise test for the V-ribbed belt of Inventive Examples 11-16 (Ex-11 to Ex-16) and Comparative Examples 5 and 6 (CE-5 and CE-6) are discussed.

Table 1 shows the properties of the fabric used in Examples 11-16. Examples 11-16 are the V-ribbed belt whose ribbed surface was covered with knitted fabric. On the other hand, the ribbed surface of Comparative Example 5 was covered with tissue (non-woven fabric), and the ribbed surface of Comparative Example 6 was ground and no fabric was applied. The fabric of Examples 11-14, and 16 contained 15% polyurethane (elastic yarn), and Example 15 contained 30% polyurethane with the remainder non-elastic yarn. As for the non-elastic yarn, Examples 11-13 and 16 contained cellulose yarn, such as cotton, and Examples 12-15 contained non-cellulose yarn, such as PET or PA. Namely, Examples 11 and 14-16 had a two-yarn construction and Examples 12 and 13 had a three-yarn construction. The blend ratio of Table 1 shows the ratio of the cellulose yarn to the non-cellulose yarn for the balance excluding the PU content (elastic yarn). Furthermore, the longitudinal elongation (extension), the lateral elongation in percentage at 9.807N/25 mm for each fabric, and the thickness (mm) are listed in Table 1. Note that the fabric with the stretchability greater than 80% at 9.807N/25 mm width in the belt lateral direction and greater than 10% at 9.807N/25 mm width in the belt longitudinal direction is used.

TABLE 1

|  | CE-5 | CE-6 | Ex-11 | Ex-12 | Ex-13 | Ex-14 | Ex-15 | Ex-16 |
|---|---|---|---|---|---|---|---|---|
| Rib-coverage | Tissue | ground | knit | knit | knit | knit | knit | knit |
| PU content | N/A | N/A | 15% | 15% | 15% | 15% | 30% | 15% |
| Cellulose yarn | N/A | N/A | cotton | cotton | cotton | — | — | cotton |
| Non-cellulose yarn | N/A | N/A | — | PET | PA | PET | PA | — |
| Blend ratio | N/A | N/A | — | 50:50 | 50:50 | — | — | — |
| Longitudinal elongation at 9.807 N/25 mm, (%) | N/A | N/A | 400 | 433 | 400 | 270 | 250 | 380 |
| Lateral elongation at 9.807 N/25 mm, (%) | N/A | N/A | 320 | 320 | 400 | 125 | 125 | 255 |
| Fabric thickness, mm | N/A | N/A | 0.9 | 1.0 | 1.0 | 1.1 | 0.9 | 1.1 |

Table 2 gives the specifications of the V-ribbed belt prototypes used in Examples 11-16 and Comparative Examples 5 and 6. The lateral elongation (extension) and the longitudinal elongation are the extensions in each direction after the knitted fabric was applied on the belt.

TABLE 2

|  | CE-5 | CE-6 | Ex-11 | Ex-12 | Ex-13 | Ex-14 | Ex-15 | Ex-16 |
|---|---|---|---|---|---|---|---|---|
| Belt length, mm | 1000 | 1035 | 1000 | 1000 | 1000 | 1000 | 1000 | 1000 |
| Lateral elongation, % | N/A | N/A | 80.0 | 80.0 | 80.0 | 80.0 | 80.0 | 80.0 |
| Longitudinal elongation, % | N/A | N/A | 18.6 | 21.4 | 20.6 | 11.6 | 11.4 | 17.2 |

The results of the slip and noise test are shown in Table 3.

TABLE 3

|  |  | CE-5 | CE-6 | Ex-11 | Ex-12 | Ex-13 | Ex-14 | Ex-15 | Ex-16 |
|---|---|---|---|---|---|---|---|---|---|
| New | Slip | N | Y | N | N | N | N | N | N |
|  | Noise | ◉ | Δ | ◉ | ◉ | ◉ | ○ | ○ | ◉ |
| Conditioned | Slip | N | Y | N | N | N | Y | N | N |
|  | Noise | Δ | X | ◉ | ◉ | ◉ | Δ | Δ | ◉ |

X: over 100 dB noise
Δ: 90 dB-100 dB noise
○: 80 dB-90 dB noise
◉: below 80 dB

As shown in Table 3, Examples 11-13 and 16, inclusion of the cellulose yarn (cotton) gave good results in both slip and noise performance for both the new and conditioned V-ribbed belt.

Figure 10:
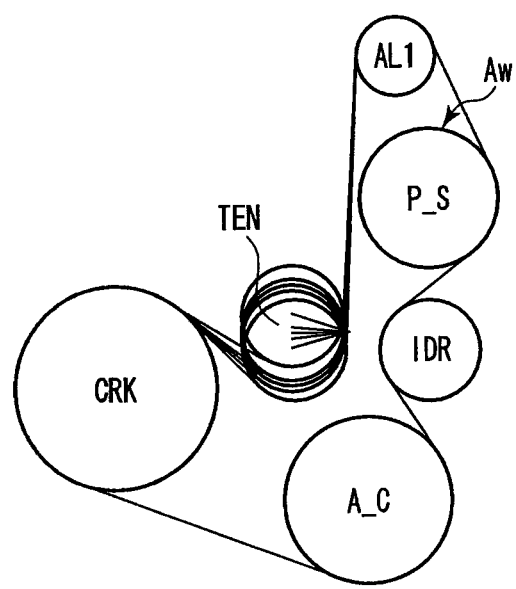
FIG. 10 is a layout of a belt drive system on which Examples 17-21 and Comparative Examples 5 and 6 were tested.

Referring to Tables 4-6 and FIG. 10, the results of the noise control durability test are next explained. Table 4 shows the properties of the fabric used in Inventive Examples 17-21, as in Table 1. Furthermore, Table 5 shows the specification of the prototype V-ribbed belt used in Examples 17-21, as in Table 2. Namely, each of the items in Tables 4 and 5 are the same as those in Tables 1 and 2. In this test, Examples 17-21 were compared with Comparative Examples 5 and 6, whose property and specification are referred to in Tables 1 and 2.

TABLE 4

|  | Ex-17 | Ex-18 | Ex-19 | Ex-20 | Ex-21 |
|---|---|---|---|---|---|
| Rib-coverage | knit | Knit | knit | knit | knit |
| PU content | 15% | 15% | 15% | 15% | 15% |
| Cellulose yarn | cotton | Cotton | cotton | — | — |
| Non-cellulose yarn | — | PET | PA | PET | PA |
| Blend ratio | — | 50:50 | 50:50 | — | — |
| Longitudinal elongation at 9.807 N/25 mm, (%) | 400 | 433 | 400 | 400 | 400 |
| Lateral elongation at 9.807 N/25 mm, (%) | 320 | 320 | 400 | 400 | 400 |
| Fabric thickness, mm | 0.9 | 1.0 | 1.0 | 1.1 | 0.9 |

TABLE 5

|  | Ex-17 | Ex-18 | Ex-19 | Ex-20 | Ex-21 |
|---|---|---|---|---|---|
| Belt length, mm | 1510 | 1510 | 1510 | 1510 | 1510 |
| Lateral elongation, % | 80.0 | 80.0 | 80.0 | 80.0 | 80.0 |
| Longitudinal elongation, % | 65 | 65 | 65 | 65 | 65 |

FIG. 10 shows the layout of a belt drive system on which Examples 17-21 and Comparative Examples 5 and 6 were tested. The noise control durability test was carried out on an actual engine accessory drive system. The V-ribbed belts were entrained around a crankshaft pulley CRK, a tensioner pulley TEN, an alternator pulley AL1, a power steering pump pulley P_S, an idler pulley IDR, and an air conditioner pulley A_C. The engine speed was set to an idle speed with engine unloaded (in Park) and the alternator was loaded to 100% duty. The pulley P_S was offset 4 mm from the coplanar position, which generated two degrees of belt misalignment angle.

Water was applied to the belt once every 4 hours at the entry of the power steering pump pulley P_S (indicated by arrow Aw). The test was carried out under ambient temperature until noise was detected.

The results of the noise control durability test are shown in Table 6 with numerals indicating actual hours transpired until noise onset for each example. As shown in Table 6, Examples 17-19 which include cellulose yarn, such as cotton yarn, showed good performance in noise control durability.

TABLE 6

|  | CE-5 | CE-6 | Ex-17 | Ex-18 | Ex-19 | Ex-20 | Ex-21 |
|---|---|---|---|---|---|---|---|
| Noise Evaluation Rate | 5.2 | 2 | 100 | 70 | 40 | 0 | 24.5 |

Referring to Tables 7-9, the results of the slip and noise performance test for an inventive V-ribbed belt in which a seamless woven fabric tube was applied will be explained next. Table 7 shows the properties of the seamless woven fabric used in Inventive Example 22 and the seamed woven fabric used in Comparative Example 7 (CE-7), in the style of Table 1. The fabric of Example 22 included 28% elastic yarn (PU) with the remainder a cellulose-based yarn (cotton), while Comparative Example 7 included neither. Table 8 shows the prototype specification of the V-ribbed belt applied in Examples 22 and Comparative Example 7, in the style of Table 2.

TABLE 7

|  | CE-7 | Ex-22 |
|---|---|---|
| rib-coverage | woven | woven |
| PU content | — | 28% |
| cellulose yarn | — | cotton |
| non-cellulose yarn | PA | PA |
| warp yarn | PA | PA/PU |
| weft yarn | PA | Cotton/PU |
| Longitudinal elongation at 9.807 N/25 mm, (%) | 80 | 116 |
| Lateral elongation at 9.807 N/25 mm, (%) | 50 | 140 |
| Fabric thickness, mm | 0.6 | 1.06 |

TABLE 8

|  | CE-7 | Ex-22 |
|---|---|---|
| Belt length, mm | 1000 | 1000 |
| Lateral elongation, % | 80 | 80 |
| Longitudinal elongation, % | 5.0 | 14.4 |

As shown in Table 9, although slip did not occur for either Example 22 or Comparative Example 7, there was a significant difference in the noise performance of the new belt compared to the conditioned belt. Namely, Example 22 showed better noise performance than Comparative Example 7.

TABLE 9

|  |  | CE-7 | Ex-22 |
|---|---|---|---|
| New | Slip | N | N |
|  | Noise | Δ | ◉ |
| Conditioned | Slip | N | N |
|  | Noise | X | ◉ |

X: over 100 dB noise
Δ: 90 dB-100 dB noise
○: 80 dB-90 dB noise
◉: below 80 dB

As described above, the first embodiment used a fabric with an extension property in which the tension of the fabric is less than or equal to a first value when the extension in the axial direction of the mandrel (i.e., in the belt lateral direction) is defined as $(N \times A - L)/L$ or $(A/p - 1)$, in order to maintain the desired condition of the fabric on the rib surface (e.g. the condition that the fabric completely cover the rib surface). Furthermore, in consideration of the durability under reverse bending, the fabric used should exhibit a tension less than or equal to a second value when the extension in the circumferential direction (i.e., in belt the longitudinal direction) is defined as R/D.

Note that when knitted fabric is used instead of woven fabric, the knitted fabric should have a similar stretchability to the woven fabric (e.g., knitted of similar material and subjected to similar treatment). In this case, the knitting should be such that the knitted fabric shows the required extensibility in both directions (belt longitudinal and lateral directions). For example, weft-knitted fabric may be used, which gives good two-way extensibility. Furthermore, the weft-knitted fabric may be of a seamless tubular type. In addition, unevenness on the rib surface resulting from seams or the overlap of the fabric sheet can be avoided by using seamless knitted fabric.

[Second Embodiment]

In the following, a V-ribbed belt according to the second embodiment of the invention will be described. The V-ribbed belt according to the second embodiment is manufactured using almost the same method as in the first embodiment. However, as for the V-ribbed belt according to the second embodiment, the belt material 23 penetrates the mesh of fabric 15 to a chosen depth. In so doing, the condition of the fabric 15 on the rib surface is maintained while the characteristics (coefficient of friction, wear resistance, etc.) of the rib surface can be controlled by the amount of rib rubber material that has passed through the mesh of the fabric 15.

Namely, the rib rubber material that has passed through the mesh of the fabric 15 forms the rib surface in cooperation with the fabric 15, and therefore both the coefficient of friction and the durability of the rib surface are directly affected by the amount of rib rubber material that has fully penetrated the mesh of the fabric 15. Furthermore, the penetration of the rib rubber material through the fabric is affected by the extension of the fabric 15.

Accordingly, a V-ribbed belt with desired rib surface characteristics may be obtained by selecting a woven fabric or knitted fabric having extension properties in the belt longitudinal and belt lateral directions based on the extension specified by the shape of the belt and the characteristics required for the rib surface, wherein the rib rubber material passes through the mesh of the fabric to a predetermined extent. Note that the extension property of the fabric used in the above selection may be determined with reference to the first value and/or the second value of the fabric tension induced when the fabric is stretched to the above extension. Furthermore, the other properties of the fabric, such as mass per unit area, density, the characteristics of the yarn or filament (including thickness, finish, yarn density, yarn size, and fabric permeability upon stretching, etc.) and so on, can also be suitably selected in order to control the above-mentioned coefficient of friction and wear resistance. Incidentally, molding pressure is another process variable.

EXAMPLES

Figure 11:
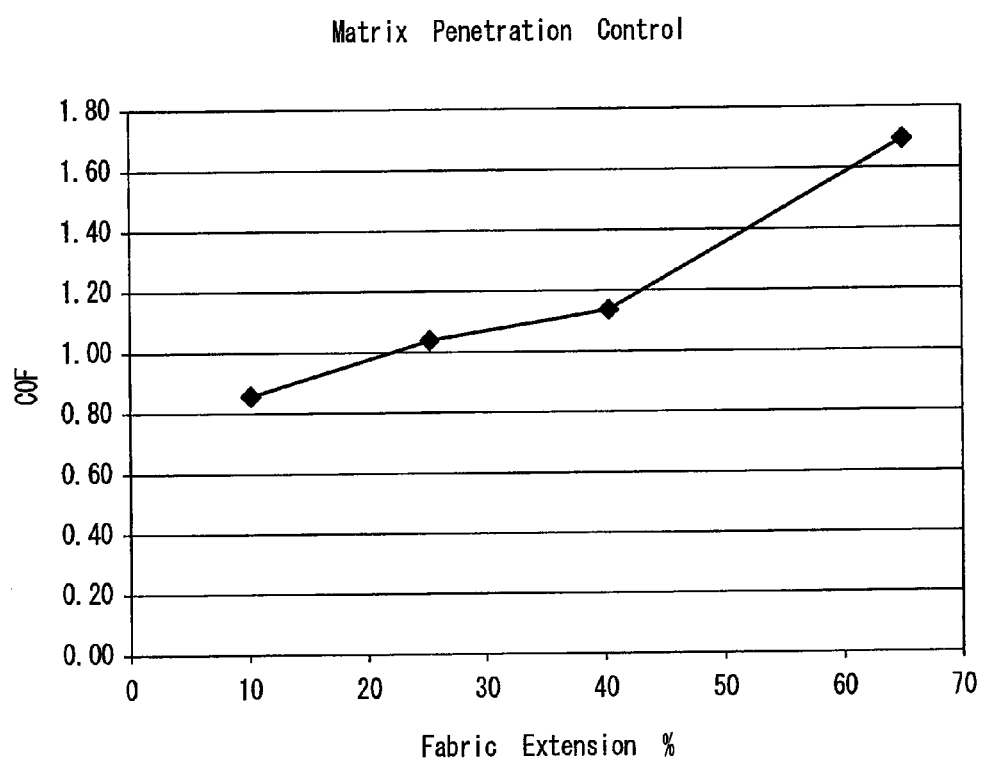
FIG. 11 illustrates the relationship between the fabric extension (%) and the coefficient of friction (COF) at the rib surface.

A rib surface with more matrix penetration will have a higher coefficient of friction, thus the coefficient of friction at the rib surface is indicative of the degree of matrix penetration. Table 10 and FIG. 11 illustrate the relationship between the fabric extension (%) and the coefficient of friction (COF) at the rib surface.

In the test, tubular knit fabric was prepared in different circumferences and stretched to different levels to fit onto a 1510 mm mold. The fabric was then stretched to different degrees in order to achieve different coefficients of friction, and the coefficient of friction was then measured. Incidentally, the fabrics of Examples 23-26 included PET and cotton yarn.

TABLE 10

|  | Ex-23 | Ex-24 | Ex-25 | Ex-26 |
|---|---|---|---|---|
| Rib-coverage | PET/cotton knit | PET/cotton knit | PET/cotton knit | PET/cotton knit |
| Knit tube OC, mm | 1372 | 1209 | 1077 | 914 |
| % fabric stretch | 10 | 25 | 40 | 65 |
| COF | 0.87 | 1.04 | 1.14 | 1.69 |

OC: outer circumference

As shown in FIG. 11 and Table 10, the coefficient of friction at the rib surface increases as the extension of the fabrics increase. Namely, by selecting the fabric stretchability, the penetration of the matrix can be indirectly controlled and in turn the coefficient of friction at the rib surface can be controlled.

Note that in the present application, the term "penetrate" includes both permeation of rubber into the fabric texture and penetration where the rubber passes through the mesh of the fabric. In addition, the phrases "does not penetrate" and "does not fully penetrate" describe permeation where the rubber does not pass through the mesh to the other side.

Although the embodiments of the present invention have been described herein with reference to the accompanying drawings, obviously many modifications and changes may be made by those skilled in this art without departing from the scope of the invention.

What is claimed is:

1. A V-ribbed belt, comprising a ribbed surface directly covered by fabric, said fabric being stretchable in two predetermined directions;
   wherein one of said two predetermined directions corresponds to the belt lateral direction and the other corresponds to the belt longitudinal direction.

2. The V-ribbed belt of claim 1, wherein said fabric comprises elastic yarn and at least one type of non-elastic yarn.

3. The V-ribbed belt of claim 2 wherein said fabric is a weft-knitted fabric.

4. The V-ribbed belt according to claim 3, wherein said weft-knitted fabric is made by feeding separately the elastic yarn and the at least one type of non-elastic yarn during the fabric manufacturing process.

5. The V-ribbed belt according to claim 4, wherein said weft-knitted fabric is seamless tubular weft-knitted fabric.

6. The V-ribbed belt according to claim 4, wherein said at least one type of non-elastic yarn comprises cellulose-based fiber or yarn.

7. The V-ribbed belt according to claim 4, wherein said at least one type of non-elastic yarn comprises non-cellulose-based fiber or yarn.

8. The V-ribbed belt according to claim 4, wherein said at least one type of non-elastic yarn comprises a blend of cellulose-based fiber or yarn and non-cellulose-based fiber or yarn.

9. The V-ribbed belt according to claim 4, wherein said weft-knitted fabric consists of a two-yarn construction consisting of said elastic yarn and said at least one type of non-elastic yarn.

10. The V-ribbed belt according to claim 4, wherein said weft-knitted fabric comprises at least three types of yarns, including said elastic yarn, at least one type of cellulose-based non-elastic yarn, and at least one type of non-cellulose-based non-elastic yarn, and said weft-knitted fabric is made by feeding separately the three different types of yarns during the fabric manufacturing process.

11. The V-ribbed belt according to claim 10, wherein said cellulose-based fiber or yarn is selected from the group consisting of:
   natural fiber including cotton, linen, jute, hemp, abaca, and bamboo;
   man-made fiber including rayon and acetate;
   and combinations thereof.

12. The V-ribbed belt according to claim 10, wherein said non-cellulose-based fiber or yarn is selected from the group consisting of: polyamide, polyester, polyethylene naphthalate, acrylic, aramid, polyolefin, polyvinyl alcohol, liquid crystal polyester, polyether-etherketone, polyimides, polyketone, PTFE, e-PTFE, PPS, PBO, wool, and silk; and combinations thereof.

13. The V-ribbed belt according to claim 3, wherein said elastic yarn comprises polyurethane.

14. The V-ribbed belt according to claim 13, wherein said elastic yarn consists of polyurethane.

15. The V-ribbed belt according to claim 1;
   wherein the stretchability of said fabric is greater than 80% at 9.807N/25 mm width in the belt lateral direction and greater than 10% at 9.807N/25 mm width in the belt longitudinal direction.

16. The V-ribbed belt according to claim 15, wherein the stretchability of said fabric is at least 116% at 9.807N/25 mm width in the belt lateral direction and greater than 116% at 9.807N/25 mm width in the belt longitudinal direction.

17. The V-ribbed belt according to claim 1, wherein the tension per unit width of the fabric in the belt lateral direction is less than or equal to a first value when the extension of said fabric in the belt lateral direction has a value equal to the profile length of one rib in the belt lateral direction divided by the rib pitch, minus one.

18. The V-ribbed belt according to claim 1, wherein the tension per unit width of the fabric in the belt longitudinal direction is less than or equal to a second value when the extension of said fabric in the belt longitudinal direction has a value equal to the length of a rib tip in the belt longitudinal direction during molding in a shell having rib-forming grooves on the internal circumference thereof, minus the length of said fabric in the belt longitudinal direction at the beginning of the molding process, divided by the length of said fabric in the belt longitudinal direction at the beginning of the molding process.

19. The V-ribbed belt according to claim 18, wherein said first value is approximately 250N/50mm, and said second value is approximately 50N/50 mm.

* * * * *